United States Patent [19]

Coe et al.

[11] Patent Number: 5,258,058
[45] Date of Patent: Nov. 2, 1993

[54] NITROGEN ADSORPTION WITH A DIVALENT CATION EXCHANGED LITHIUM X-ZEOLITE

[75] Inventors: Charles G. Coe, Macungie; John F. Kirner; Ronald Pierantozzi, both of Orefield; Thomas R. White, Allentown, all of Pa.

[73] Assignee: Air Products and Chemicals, Inc., Allentown, Pa.

[21] Appl. No.: 956,707

[22] Filed: Oct. 5, 1992

[51] Int. Cl.$^5$ .............................................. B01D 53/04
[52] U.S. Cl. ....................................... 95/95; 95/130; 95/902
[58] Field of Search ................... 55/25, 26, 58, 62, 68, 55/75, 389

[56] References Cited

U.S. PATENT DOCUMENTS

| | | | |
|---|---|---|---|
| 3,140,931 | 7/1964 | McRobbie | 55/25 |
| 3,140,932 | 7/1964 | McKee | 55/68 |
| 3,140,933 | 7/1964 | McKee | 55/68 |
| 3,313,091 | 4/1967 | Berlin | 55/68 |
| 4,322,394 | 3/1982 | Mezey et al. | 423/244 |
| 4,481,018 | 11/1984 | Coe et al. | 55/68 |
| 4,544,378 | 5/1984 | Coe et al. | 55/68 |
| 4,557,736 | 12/1985 | Sircar et al. | 55/62 |
| 4,606,899 | 8/1986 | Butter et al. | 423/328 |
| 4,810,265 | 3/1989 | Lagree et al. | 55/75 X |
| 4,859,217 | 8/1989 | Chao | 55/68 |
| 4,925,460 | 5/1990 | Coe et al. | 55/75 X |
| 4,964,889 | 10/1990 | Chao | 55/75 X |
| 5,152,813 | 10/1992 | Coe et al. | 55/75 X |
| 5,171,333 | 12/1992 | Maurer | 55/75 X |
| 5,174,979 | 12/1992 | Chao et al. | 55/58 X |

FOREIGN PATENT DOCUMENTS 1580928 12/1980 United Kingdom .
2109266B 6/1983 United Kingdom .

OTHER PUBLICATIONS

Myers, A. L., et al.; "Thermodynamics of Mixed-Gas Adsorption" *Am. Inst. of Chem. Eng. J.;* 1965, 11, 121.
Miller, G. W., et al.; "Equilibria of Nitrogen Oxygen, Argon, and Air in Molecular Sieve 5A"; *Am. Inst. of Chem. Eng. J.;* 1987, 33, 194.
McCabe, et al.; "Unit Operations of Chem. Eng."; 3rd Ed; McGraw-Hill, N.Y. (1976), p. 534.
Smith, O. J. et al.; "The Optimal Design of Pressure Swing Adsorption Systems"; *Chem. Eng. Sci.;* 1991, 46(12), 2967–2976.
Kühl, G. H., "Crystallization of Low-Silica Faujasite . . ."; *Zeolites;* (1987), 7, p. 451.
Huden, et al.; "Investigation of the Arrangement & Mobility . . ."; *J. Inorgan. Nuc. Chem;* vol. 43, #10, pp. 2583–2536 (1981).

*Primary Examiner*—Robert Spitzer
*Attorney, Agent, or Firm*—Geoffrey L. Chase; James C. Simmons; William F. Marsh

[57] ABSTRACT

The present invention is directed to a process for separating nitrogen from gas mixtures containing nitrogen and less strongly adsorbed components such as oxygen, hydrogen, argon or helium by use of an at least binary exchanged X-zeolite having lithium and a divalent cation selected from the group consisting of barium, cobalt, copper, chromium, iron, magnesium, manganese, nickel, zinc and mixtures thereof in a ratio of preferably 5% to 50% of the divalent cation and 50% to 95% lithium.

22 Claims, No Drawings

NITROGEN ADSORPTION WITH A DIVALENT CATION EXCHANGED LITHIUM X-ZEOLITE

TECHNICAL FIELD

The present invention is directed to gas separations using nitrogen selective adsorbents. More particularly, the present invention is directed to at least binary exchanged X-zeolites using a combination of lithium and various divalent cations to recover oxygen or nitrogen from gas mixtures containing them, such as air.

BACKGROUND OF THE PRIOR ART

Adsorptive separations using zeolitic structures as adsorbents are well known in the prior art for resolving a multitude of gas mixtures. Such separations are predicated upon the compositions of the gas mixtures and the components' selectivity for adsorption on adsorbents, such as zeolites.

The use of nitrogen in industrial gas applications has seen significant growth particularly with the development of non-cryogenic gas mixture separations. A major field of nitrogen separation comprises the separation of nitrogen from air. The removal of nitrogen from air results in an enriched oxygen gas component which is less strongly adsorbed by appropriate zeolites which are selective for nitrogen adsorption. When oxygen is desired as product typically at elevated pressure, it is desirable to adsorb nitrogen from air to result in unadsorbed oxygen enriched product passing over a nitrogen selective adsorbent. The nitrogen is then removed during a stage of desorption, typically at lower pressure. This results in oxygen being recovered at the pressure of the feed air, while nitrogen is recovered at a pressure below the feed air pressure. As a result, for the production of oxygen without significant pressure loss in an adsorptive separation of air, it is desirable to utilize nitrogen selective adsorbents such as the family of zeolites.

Although various zeolites are naturally occurring and various synthetic zeolites are known, some of which have appropriate selectivities for nitrogen over oxygen and other less strongly adsorbed substances such as hydrogen, argon, helium and neon, the industry has attempted to enhance the performance of various zeolites to improve their selectivity and capacity for nitrogen over such less strongly adsorbed substances such as oxygen. For instance, in U.S. Pat. No. 4,481,018, various polyvalent cation (particularly alkaline earth elements magnesium, calcium, strontium and barium) X-zeolites and faujasites are known which have low silicon to aluminum ratios in the order of approximately 1 to 1.2. The zeolites of this patent have utility for nitrogen adsorption, particularly from gas mixtures such as air when activated in a particular technique which minimizes the presence of water as it evolves from the material. The technique is further described in U.S. Pat. No. 4,544,378.

In U.K. Patent 1,580,928, a process for making low silica X-zeolites ("LSX"; where LSX is X-zeolite with a Si/Al = 1) is set forth comprising preparing an aqueous mixture of sources of sodium, potassium, aluminate and silicate and crystallizing the mixture at below 500° C. or aging the mixture at 500° C. or below followed by crystallizing the same at a temperature in the range of 600° C. to 1000° C.

Gunter H. Kuhl in an article "Crystallization of Low-Silica Faujasite" appearing in Zeolites (1987) 7, p451 disclosed a process for making low silica X-zeolites comprising dissolving sodium aluminate in water with the addition of NaOH and KOH. Sodium silicate was diluted with the remaining water and rapidly added to the $NaAlO_2$-NaOH-KOH solution. The gelled mixture was then aged in a sealed plastic jar for a specified time at a specified temperature. The product was filtered and washed.

Other low silica X-zeolite synthesis processes are available, such as those set forth in U.S. Pat. No. 4,606,899.

In U.S. Pat. No. 3,140,931, the use of crystalline zeolitic molecular sieve material having apparent pore sizes of at least 4.6 Angstroms for separating oxygen-nitrogen mixtures at subambient temperatures is disclosed.

U.S. Pat. No. 3,140,932 specifically claims Sr, Ba, or Ni ion exchanged forms of zeolite X.

U.S. Pat. No. 3,313,091 claims the use of SrX-zeolite at adsorption temperatures near atmospheric, and subatmospheric desorption pressures.

It is also known in U.S. Pat. No. 4,557,736 to modify X-zeolites by ion exchange of available ion sites with several divalent cations to produce a binary ion exchanged X-zeolite wherein the binary ions which are exchanged comprise calcium and strontium. These binary ion exchanged X-zeolites using calcium and strontium are reported to have higher nitrogen adsorption capacity, low heat of nitrogen adsorption and good nitrogen selectivity for air separation.

It is also known to exchange X-zeolites with lithium to provide an improved nitrogen selective adsorbent as set forth in U.S. Pat. No. 4,859,217. This patent suggests an improved nitrogen adsorbent can be achieved when an X-zeolite is exchanged with lithium cations at greater than 88%. The starting material for this patented zeolite is sodium X-zeolite. Therefore, the patent recites a lithium-sodium X-zeolite for nitrogen adsorption.

The prior art lithium X-zeolite was reported in U.S. Pat. No. 3,140,933 as useful for nitrogen-oxygen separations.

In an article entitled, "Investigations of the Arrangement and Mobility of Li ions in X- and Y-zeolites and the Influence of Mono- and Divalent Cations on It" by H. Herden, W. D. Einicke, R. Schollner and A. Dyer, appearing in J. Inorganic Nuclear Chemistry, Vol. 43, No. 10, pages 2533 thru 2536 (1981), the existence of mixed cation, lithium and calcium, barium and zinc exchanged X-zeolites are set forth. Physical parameters of the exchange zeolites are discussed with a general recitation to adsorptive and catalytic utilities of zeolites in general.

Although improved exchanged X-zeolite adsorbents have been reported in the art for nitrogen adsorptions, and particularly the high performance of highly lithium exchange X-zeolites are known, such zeolites are difficult to achieve at high level lithium exchange and constitute an expensive adsorbent to produce for nitrogen separations. Such production difficulties and expense limit the use of such exchanged X-zeolites to produce either nitrogen or oxygen in competition with other separation technologies, such as cryogenic distillation and membrane separations. Therefore, a problem exists in the art for providing an appropriately exchanged X-zeolite for effective nitrogen adsorptive separation using an exchanged X-zeolite which is readily produced and has a favorable cost so as to result in competitively priced nitrogen, oxygen or other gas component product pricing. The art also desires to have a high selectivity exchanged X-zeolite with reasonable working capacities which do not inhibit continuous operation or adsorbent regeneration. These unresolved problems are achieved by the present invention, which is set forth below.

BRIEF SUMMARY OF THE INVENTION

The present invention is a process for selectively adsorbing nitrogen from a gas mixture containing nitrogen and at least one less strongly adsorbed component which comprises contacting the gas mixture with an adsorbent which is selective for the adsorption of nitrogen, comprising a crystalline X-zeolite having a zeolitic Si/Al ratio less than or equal to 1.5 and an at least binary ion exchange of exchangeable ion content with between 50% and 95% lithium and with between 5% and 95% of a second ion selected from the group consisting of barium, cobalt, copper, chromium, iron, magnesium, manganese, nickel, zinc and mixtures thereof, wherein the sum of the lithium and second ion in ion exchange is at least 60% of the exchangeable ion content.

Preferably, the zeolite is ion exchanged with lithium to approximately 50% to 95%.

Preferably, the zeolite is ion exchanged with the second ion to approximately 5% to 50%.

Preferably, the zeolite is ion exchanged with approximately 15–30% of the second ion and 85–70% lithium.

Preferably, the zeolite is ion exchanged with approximately 15% of the second ion and 85% lithium.

Preferably, the second ion is magnesium. Alternatively, the second ion is nickel. Further alternatively, the second ion is barium. Alternatively, the second ion is manganese. Further alternatively, the second ion is zinc.

Preferably, the gas mixture contains nitrogen and oxygen. More preferably, the gas mixture is air.

Preferably, the Si/Al ratio is approximately 1.

Preferably, an oxygen and nitrogen containing gas mixture contacts a zone of such adsorbent, the nitrogen is selectively adsorbed and the oxygen passes through the zone and is recovered as an oxygen enriched product.

Preferably, the oxygen product has a purity of at least approximately 90% oxygen.

Preferably, the adsorption is conducted at an average bed temperature in the range of approximately 55° to 135° F.

Preferably, the zone is operated through a series of steps comprising: adsorption, during which the gas mixture contacts the adsorbent, nitrogen is selectively adsorbed and oxygen passes through zone as product; depressurization during which the gas mixture contact is discontinued and the zone is reduced in pressure to desorb the nitrogen; and repressurization with oxygen product to the adsorption pressure.

Preferably, the adsorption pressure is in the range of approximately 35 to 65 psia.

Preferably, the depressurization is conducted down to a level in the range of approximately 14.7 to 16.7 psia.

Alternatively, the zone is operated through a series of steps comprising: adsorption, during which the gas mixture contacts the adsorbent, nitrogen is selectively adsorbed and oxygen passes through zone as product; depressurization during which the gas mixture contact is discontinued and the zone is reduced in pressure to desorb the nitrogen; evacuation to further desorb the nitrogen to below ambient pressure; and repressurization with oxygen product to the adsorption pressure.

Preferably, the adsorption pressure is in the range of approximately 900 to 1600 torr.

Preferably, the evacuation is conducted down to a level in the range of approximately 80 to 400 torr.

DETAILED DESCRIPTION OF THE INVENTION

The process of the present invention directed to nitrogen adsorption from gas mixtures of less strongly adsorbed components, such as: oxygen, hydrogen, argon and helium is achieved by the use of a binary, ternary or further exchanged X-zeolite wherein, typically, a sodium or sodium, potassium X-zeolite is exchanged with lithium and a second ion or divalent cation selected from the group consisting of barium, cobalt, copper, chromium, iron, magnesium, manganese, nickel, zinc or mixtures of these ("divalent cation") either co-currently or sequentially to result in a lithium, divalent cation X-zeolite, which may contain a residual minor amount of sodium or potassium ions. The lithium content is in the range of approximately 5% to 95% lithium, preferably 70% to 85%, more preferably, 85%. The appropriate respective divalent cation content is between 5% and 95%, preferably 15% to 30%, more preferably 15%, but obviously the combination of lithium and divalent cation chosen for any set of percentages would not exceed 100% and in some instances may be less than 100% based upon residual sodium or potassium cation content. Preferably, the X-zeolite is a low silica X-zeolite with a Si/Al ratio of approximately 1 and with approximately 15% divalent cation and 85% lithium, although any combination of exchange wherein the lithium and divalent cation is at least 60% of the exchangeable ion content in the zeolite is acceptable.

Although other ion forms of X-zeolites can be used, typically a sodium or mixed sodium/potassium X-zeolite is used to prepare the at least binary ion exchanged materials. Typically, the ions are exchanged co-currently, although they can be exchanged sequentially, for example by exchanging a sodium X-zeolite with magnesium to produce a magnesium X-zeolite, which can then be partially ion exchanged with lithium to yield the desired adsorbent. The ion exchange is accomplished by contacting the sodium or mixed sodium and potassium X-zeolite with a solution of a soluble salt of the ion to be exchanged, such as chloride, nitrate, sulfate or acetate. Other methods of ion exchange are contemplated and can be used for the present invention.

The at least binary ion exchanged X-zeolites of the present invention exhibit higher nitrogen capacity and nitrogen/oxygen selectivity than that observed for the comparable prior art lithium, sodium X-zeolite at the same lithium exchange level and higher than that observed for the comparable prior art divalent cation, sodium X-zeolite at the same divalent cation exchange level.

The use of the listed divalent cations to make lithium, divalent cation X-zeolites results in a lower cost adsorbent than the highly exchanged levels of lithium X-zeolite because the exchange of the listed divalent cations for sodium is much more thermodynamically favorable than the exchange of lithium for sodium, and the listed divalent cation salts typically cost less than lithium salts. The ability to alter the respective amounts of the listed divalent cations and lithium exchange provides far more flexibility in optimizing the adsorbent properties for various gas separation operations. A preferred use for the at least binary ion exchanged X-zeolites of the present invention is the separation of nitrogen from oxygen in air using a pressure swing adsorption ("PSA") or vacuum swing adsorption ("VSA") process. In such a process, an adsorbent bed comprising binary ion exchanged lithium, divalent cation X-zeolite, as described above, is initially pressurized with oxygen. A gas stream comprising nitrogen and oxygen, such as air at a temperature between 0° and 50° C. and a pressure between 1 atmosphere and 5 atmospheres, is passed over the adsorbent bed. A portion of the nitrogen in the gas stream is adsorbed by said ion exchanged zeolites, thereby producing an oxygen-enriched product stream. The nitrogen containing adsorbent bed is subsequently depressurized and evacuated with the option of being purged with oxygen enriched gas to produce a nitrogen enriched stream. The bed is then repressurized with product oxygen and adsorption can be reinitiated. Alternatively, these materials can be used for recovering a nitrogen enriched product using, for example, an existing nitrogen vacuum swing adsorption process as described in U.S. Pat. No. 4,013,429, wherein the process includes the steps of feed, rinse, desorption, and repressurization.

Although the at least binary exchange levels of lithium and divalent cation on the X-zeolite demonstrate high performance for nitrogen selective adsorptive separation, additional benefit can be achieved by the appropriate selection or treatment of the aluminum content of the zeolitic framework to produce preferred results. X-zeolites typically have a silicon to aluminum ratio less than or equal to 1.5 and typically between 1.2 and 1.5. For the purposes of the present invention using binary exchanged X-zeolites however, it is preferred to use a low silica X-zeolite having a silicon to aluminum ratio of approximately 1.

The adsorbent must be dehydrated before being used for gas separation using a thermal activation step. Such a thermal activation step can be achieved by a number of different methods in which the zeolitic water and the hydration spheres associated with the extra-framework cation are carefully removed and the amount of water in the gaseous environment in contact with the zeolite during this step is minimized. That is, the partial pressure of water making such contact should be less than about 0.4 atmospheres, preferably not more than about 0.1 atmospheres at temperatures above about 150° C.

One method of accomplishing this is to subject the at least binary exchanged X-zeolite composition, which contains up to about 30% by weight of water, to pressures in the range of about 0.1 to 10 atmospheres while maintaining sufficient molar mass velocities and residence times of a flow of a non-reactive purge gas, that is a molar mass velocity of about 0.5 to 100 kilograms mole per meter squared hour and a residence time of no greater than about 2.5 minutes, and then heat the composition at a temperature ramp of 0.1° to 40° C. per minute up to a temperature of at least about 300° C. and no greater than about 650° C. The residence time is defined as the volume of the column or other unit used to thermally activate the zeolite divided by the volumetric flow rate of the purge gas at the standard temperature and pressure. The molar mass velocity is the flow rate of the purged gas divided by the cross-sectional area of the column used for thermal activation. The purpose of the purge gas is to provide a sufficient mass for efficient heat and mass transfer from the surface of the adsorbent at a residence time to limit the water in the purge gas exiting the adsorbent bed to the desired low limits. The minimum residence time is determined by economic and process constraints, although times of less than 0.0025 minutes would appear to provide no advantages.

Another method of thermal activation is to conduct the activation under less than about 0.1 atmospheres vacuum without the use of the purge gas and to heat the material to the desired activation temperature and a ramp temperature of from 0.1° to 40° C. per minute.

Still another method that is available for thermal activation of zeolitic adsorbents is the use of microwave radiation, conditions that are described in U.S. Pat. No. 4,322,394, of which the description of the microwave procedure for thermally activating zeolites is incorporated herein by reference.

EXAMPLE 1

$M^{2+}$, Lithium LSX-Zeolite

This example demonstrates the adsorptive properties of the mixed cation forms of Low Silica X-zeolite (LSX-zeolite, $Si/Al=1$) containing lithium and a divalent cation ($M^{2+}$). The zeolitic adsorbents used in demonstrating the invention were prepared in the following way.

Sodium, potassium LSX-zeolite was prepared by the method of Kuhl ("Crystallization of Low-Silica Faujasite" in *Zeolites* 1987, 7, 451) which comprises dissolving sodium aluminate in water with the addition of NAOH and KOH. Sodium silicate is diluted with the remaining water and rapidly added to the $NaAlO_2$-NaOH-KOH solution. The gelled mixture is then aged in a sealed plastic jar for a specified time at a specified temperature. The product is filtered and washed.

Lithium LSX-Zeolite was prepared by ion exchange of sodium, potassium LSX-zeolite powder using five static exchanges at 100° C. with a 6.3-fold equivalent excess of 2.2M LiCl. Sodium LSX-zeolite was prepared by ion exchange of sodium, potassium LSX-zeolite using three static exchanges at 100° C. with a 4.2-fold equivalent excess of 1.1M NaCl. Various exchange levels of $M^{2+}$, lithium LSX-zeolite were prepared by adding separate samples of the initially prepared lithium LSX-zeolite powder to stoichiometric amounts of 0.1N $M^{2+}$ salt solution with a pH between 5.6 and 7.0 and stirring at room temperature for about 4 hours. The mixed cation samples were filtered but not washed. The samples were analyzed by Inductively Coupled Plasma-Atomic Emission Spectroscopy (ICP-AES) for silicon, aluminum, and divalent cation, and Atomic Absorption Spectroscopy for lithium, sodium, and potassium.

EXAMPLE 2

Isotherms for $M^{2+}$, Lithium LSX-Zeolite

Nitrogen ($N_2$) and oxygen ($O_2$) isotherms were obtained for the $M^{2+}$, lithium LSX-zeolite samples using a high pressure volumetric isotherm unit. Approximately 2-2.5 g of sample was loaded into a stainless steel sample cylinder protected with a 20-micron filter to prevent loss of sample. The samples were heated under vacuum at 1° C./min or less to 400° C. and held at 400° C. until the pressure dropped below $1 \times 10^{-5}$ torr. After activation, $N_2$ and $O_2$ isotherms were obtained to 12000 torr at 23 and 45° C. The isotherm data was fit to standard adsorption isotherms. The fits were used to generate $N_2$ capacities at 1 atm, 23° C. and isothemal $N_2$ working capacities from 0.2 to 1.2 atm at 23° C.

Table I lists the identity of the exchanged $M^{2+}$ cation, the divalent cation salt used for the exchange, the pH of the ion exchange solution prior to addition of the zeolite, the results of elemental analyses for lithium and $M^{2+}$ in the exchanged samples (as $M^{2+}/Al$ and Li/Al equivalent ratios), the $N_2$ capacities ($N_m$(obs)), and the isothermal $N_2$ working capacities ($N_m$(delta)).

TABLE I $N_2$ Capacity and $N_2/O_2$ Selectivity for ($M^{2+}$, Li) LSX-Zeolite

| $M^{2+}$ i.d. | $M^{2+}$ salt | $pH^a$ | $M^{2+}/Al$, eq ratio | Li/Al, eq ratio | $N_m$ (obs),[b] mmol/g | $N_m$ (delta),[c] mmol/g | $\alpha$ $(N_2/O_2)^d$ |
|---|---|---|---|---|---|---|---|
| Mg | $MgCl_2$ | 6.9[e] | 0.15 | 0.80 | 1.29 | 0.98 | 9.4 |
| Mg | $MgCl_2$ | 7.0[e] | 0.30 | 0.67 | 1.13 | 0.83 | 8.9 |
| Ba | $BaCl_2$ | 6.2[f] | 0.29 | 0.62 | 0.89 | 0.67 | n/a |
| Mn | $MnCl_2$ | 5.6 | 0.15 | 0.80 | 1.32 | 1.01 | 9.3 |
| Mn | $MnCl_2$ | 5.6 | 0.30 | 0.67 | 1.20 | 0.89 | 8.6 |
| Ni | $NiCl_2$ | 6.1 | 0.16 | 0.84 | 1.26 | 0.97 | 9.2 |
| Ni | $NiCl_2$ | 5.9 | 0.30 | 0.64 | 1.24 | 1.05 | 9.1 |
| Ni | $NiCl_2$[g] | 5.9 | 0.43 | 0.51 | 1.03 | 0.81 | 8.4 |
| Zn | $Zn(CH_3CO_2)_2$ | 6.2 | 0.14 | 0.81 | 1.24 | 0.94 | 9.0 |
| Zn | $Zn(CH_3CO_2)_2$ | 6.2 | 0.31 | 0.70 | 0.98 | 0.72 | 8.1 |

[a]pH of salt solution prior to addition of zeolite.
[b]$N_m$ (obs) = nitrogen capacity at 1 atm, 23° C.
[c]$N_m$ (delta) = isothermal nitrogen working capacity from 0.2 to 1.2 atm at 23° C.
[d]$\alpha$ $(N_2/O_2)$ = $N_2/O_2$ selectivity for air at 1.45 atm, 30° C., calculated from IAST.
[e]pH adjusted from 5.0 with $Mg(OH)_2$.
[f]pH adjusted from 5.0 with LiOH.
[g]Greater than stoichiometric amount of Ni was added.
n/a = not analyzed.

EXAMPLE 3

Isotherms for $M^{2+}$, Sodium LSX-Zeolite

For comparative purposes, various exchange levels of $M^{2+}$, sodium LSX-zeolite representative of the prior art were prepared in a similar manner by adding separate samples of the initially prepared sodium LSX-zeolite powder to stoichiometric amounts of 0.1N $M^{2+}$ salt solution and stirring at room temperature for about 4 h. The mixed cation samples were filtered but not washed. $N_2$ and $O_2$ isotherms were obtained for the $M_{2+}$, sodium LSX-zeolite samples using a high pressure volumetric isotherm unit as described above. Table II lists the identity of the exchanged $M^{2+}$ cation, the results of elemental analyses for sodium and $M^{2+}$ in the exchanged samples (as $M^{2+}/Al$ and Na/Al equivalent ratios), $N_2$ capacities ($N_m$(obs)), and isothermal $N_2$ working capacities ($N_m$(delta)).

TABLE II $N_2$ Capacity for Prior Art ($M^{2+}$, Na)LSX-Zeolite

| $M^{2+}$ identity | $M^{2+}/Al$, eq ratio | Na/Al, eq ratio | $N_m$(obs),[a] mmol/g | $N_m$(delta),[b] mmol/g |
|---|---|---|---|---|
| Mg | 0.29 | 0.70 | 0.41 | 0.40 |
| Ba | 0.29 | 0.67 | 0.60 | 0.56 |
| Mn | 0.28 | 0.69 | 0.41 | 0.40 |
| Ni | 0.29 | 0.70 | 0.35 | 0.34 |
| Zn | 0.29 | 0.72 | 0.37 | 0.36 |

[a]$N_m$(obs) = nitrogen capacity at 1 atm, 23° C.
[b]$N_m$(delta) = isothermal nitrogen working capacity from 0.2 to 1.2 atm at 23° C.

EXAMPLE 4

Isotherms for Lithium, Sodium LSX-Zeolite

Additionally, for comparative purposes, various exchange levels of lithium, sodium LSX-zeolite representative of the prior art were prepared in a similar manner by adding separate samples of the initially prepared lithium LSX-zeolite powder to stoichiometric amounts of 0.1N NaCl and stirring at room temperature for about 4 h. The mixed cation samples were filtered but not washed. $N_2$ and $O_2$ isotherms were obtained for the lithium, sodium LSX-zeolite samples using a high pressure volumetric isotherm unit as described above. Table III lists the results of elemental analyses for lithium and sodium in the exchanged samples (as Li/Al and Na/Al equivalent ratios), $N_2$ capacities ($N_m$(obs)), and isothermal $N_2$ working capacities ($N_m$(delta)).

TABLE III $N_2$ Capacity and $N_2/O_2$ Selectivity for Prior Art NaLSX-Zeolite and (Li, Na)LSX-Zeolite

| Li/Al eq ratio | Na/Al eq ratio | $N_m$(obs),[a] mmol/g | $N_m$(delta),[b] mmol/g | $\alpha(N_2/O_2)^c$ |
|---|---|---|---|---|
| n/a | 1.09 | 0.47 | 0.46 | 3.6 |
| 0.70 | 0.27 | 0.49 | 0.46 | 4.0 |
| 0.80 | 0.14 | 0.91 | 0.77 | 6.9 |

[a]$N_m$(obs) = nitrogen capacity at 1 atm, 23° C.
[b]$N_m$(delta) = isothermal nitrogen working capacity from 0.2 to 1.2 atm at 23° C.
[c]$\alpha(N_2/O_2)$ = $N_2/O_2$ selectivity for air at 1.45 atm, 30° C., calculated from IAST.
n/a = not analyzed.

The nitrogen capacities of the $M^{2+}$, lithium LSX-zeolites of the present invention are unexpectedly high compared to adsorbents of the prior art. The nitrogen capacity for a given ion exchange level of $M^{2+}$, lithium LSX-zeolite is significantly higher than the nitrogen capacity of the comparable prior art adsorbent with the same $M^{2+}$ ion exchange level and the comparable prior art adsorbent with the same lithium ion exchange level. As an example, Table IV compares the nitrogen capacities (1 atm, 23° C.) for the case for which the given ion exchange level is 30% $M^{2+}$, 70% lithium LSX-zeolite. It compares the nitrogen capacities (from Table I) of the 30% $M^{2+}$, 70% lithium LSX-zeolites of the present invention to the nitrogen capacities (from Table II) of the prior art LSX-zeolite adsorbents with the same $M^{2+}$ ion exchange level (30% $M^{2+}$, 70% sodium LSX-zeolites) and to the nitrogen capacity (from Table III) of the prior art LSX-zeolite adsorbent with the same lithium ion exchange level (70% lithium, 30% sodium LSX-zeolite).

TABLE IV

Comparison of $N_2$ Capacity for Mixed Cation LSX-Zeolites
$N_2$ capacity at 1 atm, 23° C., mmol/g

| $M^{2+}$ | present invention 30% $M^{2+}$, 70% $Li^+$ | prior art 30% $M^{2+}$, 70% $Na^+$ | prior art 70% $Li^+$, 30% $Na^+$ |
|---|---|---|---|
| Mg | 1.13 | 0.41 | 0.49 |

TABLE IV-continued

Comparison of N₂ Capacity for Mixed Cation LSX-Zeolites
N₂ capacity at 1 atm, 23° C., mmol/g

| $M^{2+}$ | present invention 30% $M^{2+}$, 70% $Li^+$ | prior art 30% $M^{2+}$, 70% $Na^+$ | prior art 70% $Li^+$, 30% $Na^+$ |
|---|---|---|---|
| Ba | 0.89 | 0.60 | 0.49 |
| Mn | 1.20 | 0.41 | 0.49 |
| Ni | 1.24 | 0.35 | 0.49 |
| Zn | 0.98 | 0.37 | 0.49 |

As a specific example of the case for which the divalent cation at this exchange level is magnesium, it can be observed that the nitrogen capacity of 30% magnesium, 70% lithium LSX-zeolite of the present invention is 1.13 mmol/g. In contrast, the nitrogen capacity of a comparable prior art LSX-zeolite with the same magnesium ion exchange level, 30% magnesium, 70% sodium LSX-zeolite, is only 0.41 mmol/g. Likewise, the nitrogen capacity of a comparable prior art LSX-zeolite with the same lithium ion exchange level, 70% lithium, 30% sodium LSX-zeolite, is only 0.49 mmol/g. The nitrogen capacities of these prior art adsorbents are significantly lower than the nitrogen capacity of 30% magnesium, 70% lithium LSX-zeolite of the present invention.

The nitrogen capacities of other $M^{2+}$, lithium LSX-zeolites are compared similarly in Table IV. For magnesium, barium, manganese, nickel, and zinc, the nitrogen capacity of the 30% $M^{2+}$, 70% lithium LSX-zeolite of the present invention is significantly higher than the nitrogen capacity of either the comparable prior art adsorbent with the same $M^{2+}$ ion exchange level, 30% $M^{2+}$, 70% sodium LSX-zeolite, or the comparable prior art adsorbent with the same lithium ion exchange level, 70% lithium, 30% sodium LSX-zeolite. The adsorptive capacities of these $M^{2+}$, lithium LSX-zeolites demonstrate representative examples of divalent cations for the divalent alkaline earth elements of Group IIA of the Periodic Table, the divalent transition elements of Groups VIA through VIIIA, and Groups IB and IIB.

While the nitrogen capacities for $M^{2+}$, lithium LSX-zeolites with compositions around 30% $M^{2+}$, 70% lithium are particularly unexpected compared to nitrogen capacities of the most relevant adsorbents known in prior art, $M^{2+}$, lithium LSX-zeolites with other ion exchange levels such as 15% $M^{2+}$, lithium LSX-zeolites also demonstrate unexpectedly high nitrogen capacities compared to the relevant adsorbents known in the prior art. The nitrogen capacities observed for the 15% $M^{2+}$, 85% lithium LSX-zeolites of the present invention as set forth in Table I are all higher than the nitrogen capacity of 0.91 mmol/g observed for the comparable prior art adsorbent with the same lithium ion exchange level, 85% lithium, 15% sodium LSX-zeolite, as set forth in Table III. The nitrogen capacities observed for the 15% $M^{2+}$, 85% lithium LSX-zeolites of the present invention are also expected to be higher than the comparable prior art adsorbents with the same $M^{2+}$ ion exchange level, 15% $M^{2+}$, 85% sodium LSX-zeolite, since the capacities of the 30% $M^{2+}$, 70% sodium LSX-zeolites are essentially the same as that of 100% NaLSX-zeolite, and nitrogen capacities for $M^{2+}$ ion exchange levels lower than 30% would be expected to be the same.

Nitrogen capacity alone is not a measure of an adsorbent's ability to effect a separation of nitrogen from other components. Berlin, in U.S. Pat. No. 3,313,091, points out the importance of the shape and slope of the component isotherms in the pressure region of interest. Consequently, the isothermal nitrogen working capacities from 0.2 to 1.2 atm, a pressure region of interest for vacuum swing adsorption air separation processes, were also determined from the isotherm fits and are included in Tables I to III. The $M^{2+}$, lithium LSX-zeolite adsorbents of the present invention show high isothermal nitrogen working capacities that are very important for PSA nitrogen processes. Furthermore, as observed for nitrogen capacities at 1 atm, the isothemal nitrogen working capacities for the $M^{2+}$, lithium LSX-zeolites of the present invention are unexpectedly high compared to the relevant adsorbents of the prior art, $M^{2+}$, sodium LSX-zeolites with the same $M^{2+}$ ion exchange level, and lithium, sodium LSX-zeolites with the same lithium ion exchange level.

An additional property required of nitrogen adsorbents is high selectivity for adsorption of nitrogen over the less strongly adsorbed components of the gas mixture to be separated. For example, the binary $N_2/O_2$ selectivity at feed pressure is an indicator of the recovery losses from oxygen coadsorbed with nitrogen on the adsorbent bed in oxygen VSA air separation processes. Binary $N_2/O_2$ selectivities were calculated from the nitrogen and oxygen isotherm fits using ideal adsorbed solution theory (IAST) for air feed at 1.45 atmospheres, 30° C., where $N_2/O_2$ selectivity is defined as:

$$\alpha(N_2/O_2) = \frac{N_{N2}/Y_{N2}}{N_{O2}/Y_{O2}}$$

where;
$N_{N2}$=$N_2$ coadsorbed at $N_2$ partial pressure in the feed.
$N_{O2}$=$O_2$ coadsorbed at $O_2$ partial pressure in the feed.
$Y_{N2}$=mole fraction of $N_2$ in the feed.
$Y_{O2}$=mole fraction of $O_2$ in the feed.

Binary $N_2/O_2$ selectivities are also included in Tables I and III. The $M^{2+}$, lithium LSX-zeolite adsorbents of the present invention also show high $N_2/O_2$ selectivity. Furthermore, as observed for nitrogen capacities, the binary $N_2/O_2$ selectivities for the $M^{2+}$, lithium LSX-zeolites of the present invention are unexpectedly high compared to the prior art lithium, sodium LSX-zeolites with the same lithium ion exchange level.

Oxygen VSA process performance was simulated using a global energy and mass balance model similar to one described by Smith, O. J. and Westerberg, A. W. "The Optimal Design of Pressure Swing Adsorption Systems", *Chemical Eng. Sci.* 1991, 46(12), 2967–2976, which is routinely used as an indicator of relative performance in adsorbent screening. This model is similar to "Flash" calculations in distillation (e.g., McCabe, W. L. and Smith, J. C., "Unit Operations in Chemical Engineering", 3rd edition, McGraw Hill, New York (1976), p 534).

The computer process model was used to simulate a standard oxygen VSA process cycle, such as that described in GB-2109266-B that included adsorption, purge, and desorption at chosen pressures and end-of-feed temperature. The model is equilibrium based; i.e., it assumes no spatial concentration gradients and complete bed utilization. Temperature changes within the bed during the cycle are included, but the model does not account for temperature gradients (i.e., the bed temperature is uniform at any given time). As a first approximation, this is a reasonable assumption in the case of equilibrium-based separation processes. Binary equilibria are estimated using ideal adsorbed solution theory (IAST) (Meyers, A. L. and Prausnitz, J. M. *American Institute of Chemical Engineers Journal* 1965, 11, 121). This theory is accepted for physical adsorption of nitrogen-oxygen mixtures on zeolites at ambient temperatures (Miller, G. W.; Knaebel, K. S.; Ikels, K. G. "Equilibria of Nitrogen, Oxygen, Argon, and Air in Molecular Sieve 5A", *American Institute of Chemical Engineers Journal* 1987, 33, 194). Inputs for the program include isotherm parameters for nitrogen and oxygen, and adsorbent physical properties.

By way of placing the model in perspective, its predictions are comparable with data from an experimental vacuum swing adsorption unit with 8 feet long, 4 inch diameter beds. Data were compared for three different adsorbents at a variety of operating conditions. There is excellent agreement between pilot unit data and model predictions for Bed Size Factor (BSF), $O_2$ Recovery, and Actual Cubic Feet evacuated per lbmole Evacuation gas (ACF/Evac). These are the key parameters that determine the product cost from any oxygen VSA plant.

Table V compares the results of the process simulations for an oxygen VSA process cycle with a feed pressure of 1000 torr, an end of feed temperature of 75° F., and an evacuation pressure of about 300 torr for $M^{2+}$, lithium LSX-zeolite to a typical commercial 5A zeolite used for air separation. The Recovery, BSF, and ACF/Evac are normalized to a value of 1.0 for the commercial 5A zeolite. The $M^{2+}$, lithium LSX-zeolites of the present invention have significantly higher Recovery and lower BSF than the commercial 5A zeolite, and only minimally higher ACF/Evac.

TABLE V

| | O2 VSA Process Simulations for ($M^{2+}$, Li)LSX-Zeolite | | | | |
|---|---|---|---|---|---|
| sample identity | end-of-feed temp, F. | evac P, torr | Recovery, % | BSF, lb/lbmol O2 | ACF/Evac |
| Commercial 5A | 75 | 300 | 1.00 | 1.00 | 1.00 |
| 15%(Mg, Li)LSX | 75 | 315 | 1.23 | 0.67 | 1.01 |
| 30%(Mg, Li)LSX | 75 | 300 | 1.21 | 0.71 | 1.04 |
| 30%(Ni, Li)LSX | 75 | 300 | 1.29 | 0.58 | 1.07 |

The $M^{2+}$, lithium LSX-zeolite adsorbents of the present invention exhibit some unexpected and remarkable performance characteristics when used to selectively adsorb nitrogen from gas mixtures containing nitrogen in contrast to other adsorbents containing lithium or divalent cations used for such nitrogen adsorption process. The unexpectedly high nitrogen capacities of the $M^{2+}$, lithium LSX-zeolites of the present invention could not have been predicted based on the nitrogen capacities of the most relevant adsorbents known in the prior art. The nitrogen capacities of the prior art adsorbents are significantly lower than the nitrogen capacity of the $M^{2+}$, lithium LSX-zeolites of the present invention. In addition, the nitrogen working capacities and the nitrogen/oxygen selectivities of the $M^{2+}$, lithium X-zeolites of the present invention are higher than those observed for the prior art $M^{2+}$, sodium X-zeolites at the same $M^{2+}$ ion exchange level and higher than those observed for the prior art lithium, sodium X-zeolites at the same lithium ion exchange level.

The present invention has been set forth with reference to several preferred embodiments. However, the full scope of the invention should be ascertained from the claims which follow.

We claim:

1. A process for selectively adsorbing nitrogen from a gas mixture containing nitrogen and at least one less strongly adsorbed component which comprises contacting the gas mixture with an adsorbent which is selective for the adsorption of nitrogen, comprising a crystalline X-zeolite having a zeolitic Si/Al ratio $\leq 1.5$ and an at least binary ion exchange of the exchangeable ion content with between 5% and 95% lithium and with between 5% and 95% of a second ion selected from the group consisting of cobalt, copper, chromium, iron, manganese, nickel, zinc and mixtures thereof, wherein the sum of the lithium and second ion ion exchange is at least 60% of the exchangeable ion content.

2. The process of claim 1 wherein the zeolite is ion exchanged with lithium to approximately 50% to 95%.

3. The process of claim 1 wherein the zeolite is ion exchanged with the second ion to approximately 5% to 50%.

4. The process of claim 1 wherein the zeolite is ion exchanged with approximately 15-30% of the second ion and 85-70% lithium.

5. The process of claim 1 wherein the zeolite is ion exchanged with approximately 15% of said second ion and 85% lithium.

6. The process of claim 1 wherein the second ion is nickel.

7. The process of claim 1 wherein the second ion is manganese.

8. The process of claim 1 wherein the second ion is zinc.

9. The process of claim 1 wherein the gas mixture contains nitrogen and oxygen.

10. The process of claim 1 wherein the gas mixture is air.

11. The process of claim 1 wherein the Si/Al ratio is approximately 1.

12. The process of claim 1 wherein an oxygen and nitrogen containing gas mixture contacts a zone of said adsorbent, the nitrogen is selectively adsorbed and the oxygen passes through the zone and is recovered as an oxygen enriched product.

13. The process of claim 12 wherein the oxygen product has a purity of at least approximately 90% oxygen.

14. The process of claim 12 wherein the adsorption is conducted at an average bed temperature in the range of approximately 55 to 135° F.

15. The process of claim 12 wherein the zone is operated through a series of steps comprising: adsorption during which the gas mixture contacts the adsorbent, nitrogen is selectively adsorbed and oxygen passes through the zone as a product; depressurization during which the gas mixture contact is discontinued and the zone is reduced in pressure to desorb the nitrogen; and repressurization with oxygen product to the adsorption pressure.

16. The process of claim 15 wherein the adsorption pressure is in the range of approximately 35 to 65 psia.

17. The process of claim 15 wherein the desorption is conducted down to a pressure in the range of approximately 14.7 to 16.7 psia.

18. The process of claim 12 wherein the zone is operated through a series of steps comprising: adsorption during which the gas mixture contacts the adsorbent, nitrogen is selectively adsorbed and oxygen passes through the zone as a product; depressurization during which the gas mixture contact is discontinued and the zone is reduced in pressure to desorb the nitrogen; evacuation to further desorb the nitrogen to below ambient pressure; and repressurization with oxygen product to the adsorption pressure.

19. The process of claim 18 wherein the adsorption pressure is in the range of approximately 900 to 1600 torr.

20. The process of claim 18 wherein the evacuation is conducted down to a level in the range of approximately 80 to 400 torr.

21. A process for selectively adsorbing nitrogen from a gas mixture containing nitrogen and at least one less strongly adsorbed component which comprises contacting the gas mixture with an adsorbent which is selective for the adsorption of nitrogen, comprising a crystalline X-zeolite having a zeolitic Si/Al ratio $\leq 1.5$ and an at least binary ion exchange of the exchangeable ion content with between 5% and 95% lithium and with between 5% and 95% of a second ion selected from the group consisting of chromium, nickel and mixtures thereof, wherein the sum of the lithium and second ion ion exchange is at least 60% of the exchangeable ion content.

22. The process of claim 21 wherein said less strongly adsorbed component is oxygen.

* * * * *